(12) United States Patent
Ageev

(10) Patent No.: US 12,175,781 B2
(45) Date of Patent: Dec. 24, 2024

(54) SEGMENTATION OF PAGE STREAM DOCUMENTS FOR BIDIRECTIONAL ENCODER REPRESENTATIONAL TRANSFORMERS

(71) Applicant: KYOCERA Document Solutions Inc., Osaka (JP)

(72) Inventor: Yury Ageev, Pleasant Hill, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 292 days.

(21) Appl. No.: 17/843,991

(22) Filed: Jun. 18, 2022

(65) Prior Publication Data

US 2023/0410541 A1 Dec. 21, 2023

(51) Int. Cl.
*G06V 30/10* (2022.01)
*G06F 16/36* (2019.01)
*G06V 30/413* (2022.01)

(52) U.S. Cl.
CPC .............. *G06V 30/10* (2022.01); *G06F 16/36* (2019.01); *G06V 30/413* (2022.01)

(58) Field of Classification Search
CPC .... G06V 30/10; G06V 30/413; G06V 10/774; G06V 10/82; G06V 30/414; G06V 30/416; G06V 10/764; G06F 16/36; G06F 16/35; G06F 16/906; G06F 40/30; G06F 40/284; G06F 16/93; G06F 40/279; G06F 16/583; G06F 18/214; G06F 18/2148; G06F 18/217; G06F 40/205; G06F 40/253; G06F 40/295; G06F 40/40; G06N 3/08; G06N 20/00; G06N 3/045; G06N 3/088; G06N 3/0455; G06N 3/048
See application file for complete search history.

(56) References Cited

U.S. PATENT DOCUMENTS

| | | | | |
|---|---|---|---|---|
| 10,339,423 B1 * | 7/2019 | Dinerstein | ............. | G06F 18/214 |
| 10,565,234 B1 * | 2/2020 | Sims | ....................... | G06F 40/12 |
| 11,113,599 B2 * | 9/2021 | Wang | ................... | G06V 10/764 |
| 11,403,468 B2 * | 8/2022 | Pang | ......................... | G06N 3/08 |
| 11,410,445 B2 * | 8/2022 | Uppal | .................. | G06V 10/454 |
| 11,681,483 B2 * | 6/2023 | Hajdu | ..................... | G06F 3/126 358/1.15 |
| 11,741,302 B1 * | 8/2023 | Pathak | .................. | G06F 40/205 715/271 |

(Continued)

OTHER PUBLICATIONS https://arxiv.org/pdf/1810.04805.pdf Published May 24, 2019.

*Primary Examiner* — Michael S Osinski
(74) *Attorney, Agent, or Firm* — W. Eric Weobostad

(57) ABSTRACT

Systems and methods relate generally to performing a machine learning task on training documents to generate an output. In an example method, a pretrained Sentence Bidirectional Encoder Representational Transformers ("S-BERT") model is obtained. The training documents are scanned by a plurality of scanners. Content of the training documents is recognized with character recognition. The content is templated responsive to the character recognition. The content is processed with the pretrained S-BERT model for training thereof. A trained S-BERT model is generated from the processing of the content as the output. The trained S-BERT model is configured to automatically categorize and assemble non-training documents into original configurations thereof.

20 Claims, 12 Drawing Sheets

(56) References Cited

U.S. PATENT DOCUMENTS

| | | | | |
|---|---|---|---|---|
| 11,790,953 | B2* | 10/2023 | Li | G06V 20/49 |
| | | | | 715/202 |
| 12,039,766 | B2* | 7/2024 | Feng | G06V 10/82 |
| 2002/0103834 | A1* | 8/2002 | Thompson | G06F 40/284 |
| | | | | 715/256 |
| 2015/0309984 | A1* | 10/2015 | Bradford | G06F 40/263 |
| | | | | 704/8 |
| 2016/0283473 | A1* | 9/2016 | Heinze | G06F 16/22 |
| 2018/0046708 | A1* | 2/2018 | Stewart | G06V 10/762 |
| 2019/0311227 | A1* | 10/2019 | Kriegman | G06V 30/19173 |
| 2021/0158093 | A1* | 5/2021 | Kaynig-Fittkau | G06V 10/82 |
| 2021/0334457 | A1* | 10/2021 | Zhang | G06N 3/088 |
| 2022/0156300 | A1* | 5/2022 | Paruchuri | G06V 10/82 |
| 2022/0164600 | A1* | 5/2022 | Cheng | G06N 3/045 |
| 2022/0198316 | A1* | 6/2022 | Mazor | G06N 3/08 |
| 2022/0309227 | A1* | 9/2022 | Okada | G06V 30/414 |
| 2022/0374709 | A1* | 11/2022 | Kim | G06N 3/0464 |
| 2022/0374993 | A1* | 11/2022 | Kim | G06Q 40/08 |
| 2023/0022845 | A1* | 1/2023 | Meng | G06F 40/279 |
| 2023/0077608 | A1* | 3/2023 | Achiwa | G06V 30/413 |
| | | | | 382/229 |
| 2023/0197268 | A1* | 6/2023 | Tsai | G16H 15/00 |
| | | | | 382/128 |
| 2024/0013005 | A1* | 1/2024 | Ramezani | G06V 10/82 |
| 2024/0062571 | A1* | 2/2024 | Anzenberg | G06V 30/41 |
| 2024/0070794 | A1* | 2/2024 | Bonfante | G06N 20/00 |
| 2024/0086637 | A1* | 3/2024 | Cui | G06F 40/151 |

* cited by examiner

SEGMENTATION OF PAGE STREAM DOCUMENTS FOR BIDIRECTIONAL ENCODER REPRESENTATIONAL TRANSFORMERS

FIELD

The following description relates to machine learning using training documents. More particularly, the following description relates to segmentation of page stream documents for a bidirectional encoder representational transformers to provide a document page classification system.

BACKGROUND

A model of a Bidirectional Encoder Representational Transformers or "BERT" is known. Generally, a BERT is a deep learning strategy for natural language processing to assist artificial intelligence application understand context of ambiguity of words in text. More recently, a Sentence-BERT or S-BERT has been developed.

SUMMARY

In accordance with one or more below described examples, a method relating generally to a performing a machine learning task on training documents to generate an output is disclosed. In such a method, a pretrained Sentence Bidirectional Encoder Representational Transformers ("S-BERT") model is obtained. The training documents are scanned by a plurality of scanners. Content of the training documents is recognized with character recognition. The content is templated responsive to the character recognition. The content is processed with the pretrained S-BERT model for training thereof. A trained S-BERT model is generated from the processing of the content as the output. The trained S-BERT model is configured to automatically categorize and assemble non-training documents into original configurations thereof.

In accordance with one or more below described examples, a system relating generally to a performing a machine learning task on training documents to generate an output is disclosed. In such a system, a plurality of scanners are configured to scan the training documents. Each of the plurality of scanners is configured with character recognition to recognize content of the training documents. Each of the plurality of scanners is configured to template the content responsive to the character recognition. A pretrained S-BERT model is configured to process the content to train the S-BERT model. A trained S-BERT model is generated from the processing of the content as the output The trained S-BERT model is configured to automatically categorize and assemble non-training documents into original configurations thereof.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a block diagram depicting an example of a known BERT encoder.

FIG. 1-3 is a block diagram depicting an example of a known "Sentence-BERT" or "S-BERT" model.

FIG. 2 is a flow diagram of an example model building flow for training a S-BERT model.

FIG. 3-1 is a block diagram depicting an example a training system.

FIG. 3-2 is a flow diagram depicting an example of a training flow .for training a S-BERT model with the training system of FIG. 3-1.

FIG. 3-3 is a block diagram depicting an example a fine-tuning system.

FIG. 3-4 is a flow diagram depicting an example of a fine tuning flow for fine tuning training a S-BERT model with the fine tuning system of FIG. 3-3.

FIG. 3-5 is a block diagram depicting an example automatic document processing system.

FIG. 3-6 is a pictorial diagram of an example of a capture manager user interface (UI).

FIG. 3-7 is a block-flow diagram of an example of an information processing system.

FIG. 4 is a pictorial diagram depicting an example of a network.

FIG. 5 is block diagram depicting an example of a portable communication device.

FIG. 6 is a block diagram depicting an example of a multi-function printer (MFP).

FIG. 7 is a block diagram depicting an example of a computer system.

DETAILED DESCRIPTION

Figure 1:
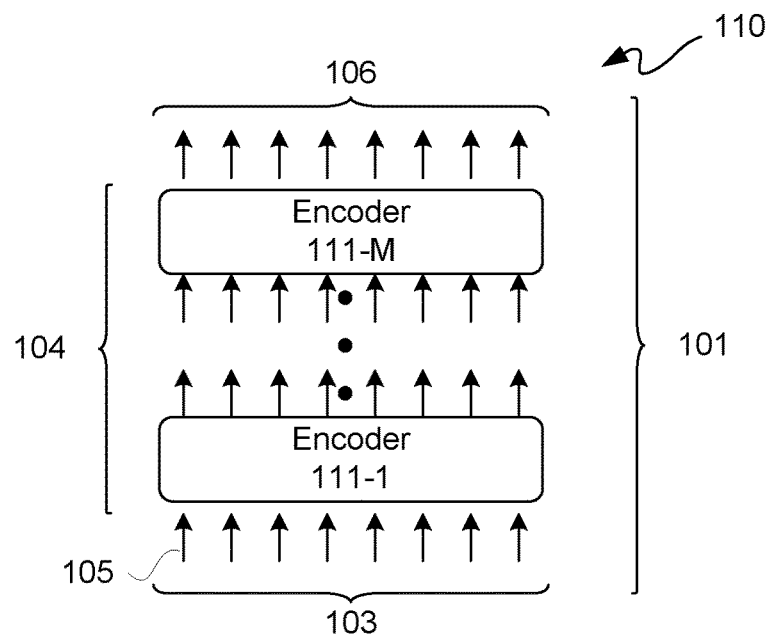
FIG. 1-1 is a block diagram depicting an example of a known Bidirectional Encoder Representational Transformers or BERT model or BERT architecture.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

A semantic search is a data search with query aimed at finding keywords, as well as to determine intent and contextual meaning of such keywords. A semantic search is to be contrasted with a lexical match form of search. Along those lines, entries may be embedded in a corpus, such as sentences, paragraphs, or documents, into a vector space.

A model of a Bidirectional Encoder Representational Transformers or "BERT" is known. BERT is a context-dependent model for use in Natural Language Processing or NLP in artificial intelligence or AI applications. BERT is configured to consider all words in a sentence input to it simultaneously, from right-to-left and from left-to-right. BERT applies an attention mechanism that considers neighboring words to develop a contextual meaning for such words, or more particularly to generate associated embeddings. However, this means a pretrained model is used each time while generating embeddings or preforming an NLP task.

As describe below in additional detail, a plurality of scanners are configured to scan, character recognize and template documents. This provides segmentation of page stream documents for a Sentence Bidirectional Encoder Representational Transformers or S-BERT. Page segmentation outcomes are streamed for encoding with a pretrained S-BERT, followed by pooling and embedding therein, to output or generate a trained S-BERT. Such a trained S-BERT may be enhanced by repeating such training with scanned, character recognized and templated documents streamed for processing, including encoding, pooling and embedding, with such a trained S-BERT to output or generate a fine-tuned S-BERT. Such a trained S-BERT or fine-tuned S-BERT may be implemented to provide a document page classification system.

With the above general understanding borne in mind, various configurations for systems, and methods therefor, for generating a trained S-BERT and a fine-tuned S-BERT are described below in additional detail.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

A BERT model 110 is available as a pretrained model using Masked Language Model or MLM and Next Sentence Prediction or NSP, namely operation 101. This training operation at 101 using Deep Learning involves a lot of computing resources and time to build a BERT model 110. For example, a training model operation may use a corpus of text from available resources like English Wikipedia with more than 6 million articles and more than 11 thousand books. Input training data sources are a part of an unsupervised machine learning process.

FIG. 1-1 is a block diagram depicting an example of a known Bidirectional Encoder Representational Transformers or BERT model or BERT architecture 110. BERT model 110 may include multiple layers of neural network encoders ("encoders") 111-1 through 111-M, for M a positive integer greater than 1. A first encoder 111-1 receive inputs 103, such as sentences from input sources, where respective arrows may represent corresponding words in an input sentence.

Along with input of sentences may be tokens or keywords. For example, a separator or SEP token may correspond to an input arrow to delineate sentences if multiple sentences are input. Along those lines, a special classification token or CLS 105 to represent an entire sentence or input may be the first token of every input sequence 103. A final hidden state corresponding to a CLS token may be used as an aggregate sequence representation for classification tasks. Thus, outputs 106 after processing through a stack of multiple layers 104 of encoders 111 may represent classification in addition to other information.

Figures 1, 2:
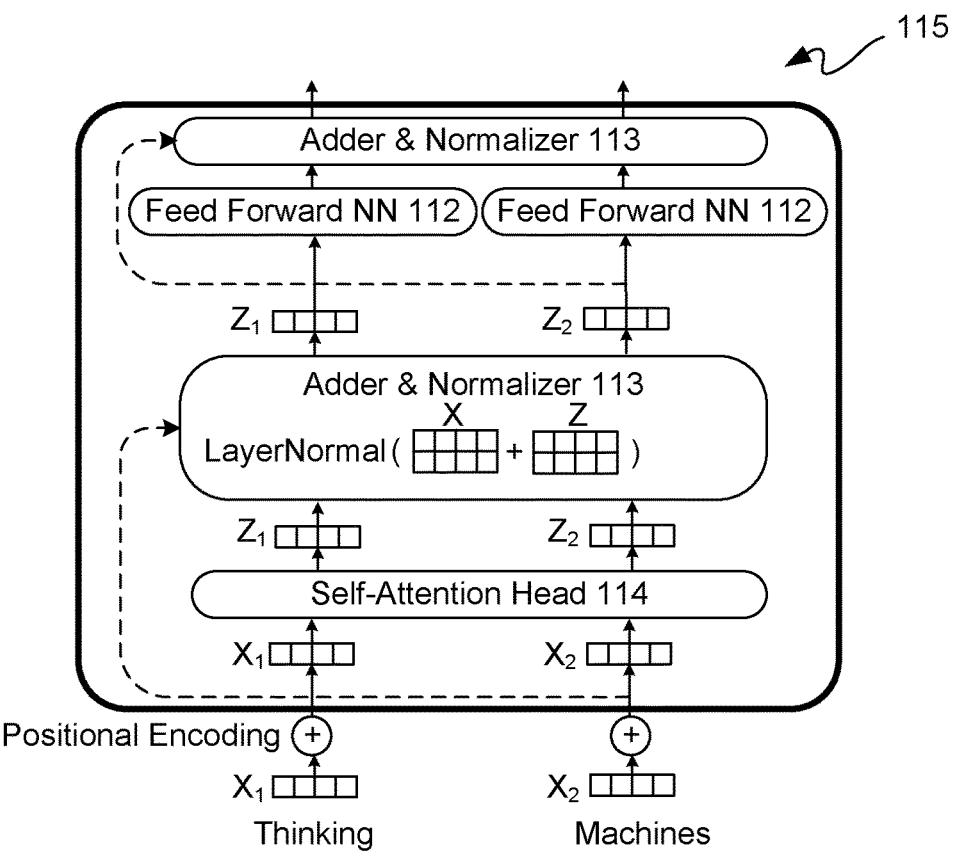

FIG. 1-2 is a block diagram depicting an example of a known BERT encoder 115. An encoder 111 of FIG. 1-2 may have a same architecture as BERT encoder 115. For clarity, BERT encoder 115 has just two of M paths. In another example, significantly more than two paths may be used. For example, a known "BERT base" model has 12 encoding layers, 12 attention heads, 110 million parameters, and a 768-dimension output size, and a known "BERT large" model has 24 encoding layers, 16 attention heads, 340 million parameters, and a 1024-dimension output size.

Generally, self-attention heads, such as self-attention head 114, receive positionally encoded information for input to an adder and normalizer 113, and outputs of such adder and normalizer 113 are provided to a path-corresponding feed forward neural network (NN) 112. Output of such feed forward neural nets 112 may be input to another adder and normalizer 113 layer.

In short, a machine learning architecture may be based on a multilayer of neural networks. At this time there are publicly available pretrained base BERT models that can be obtained for fine-tuning on for example specific business training data.

Figures 1, 2, 3:
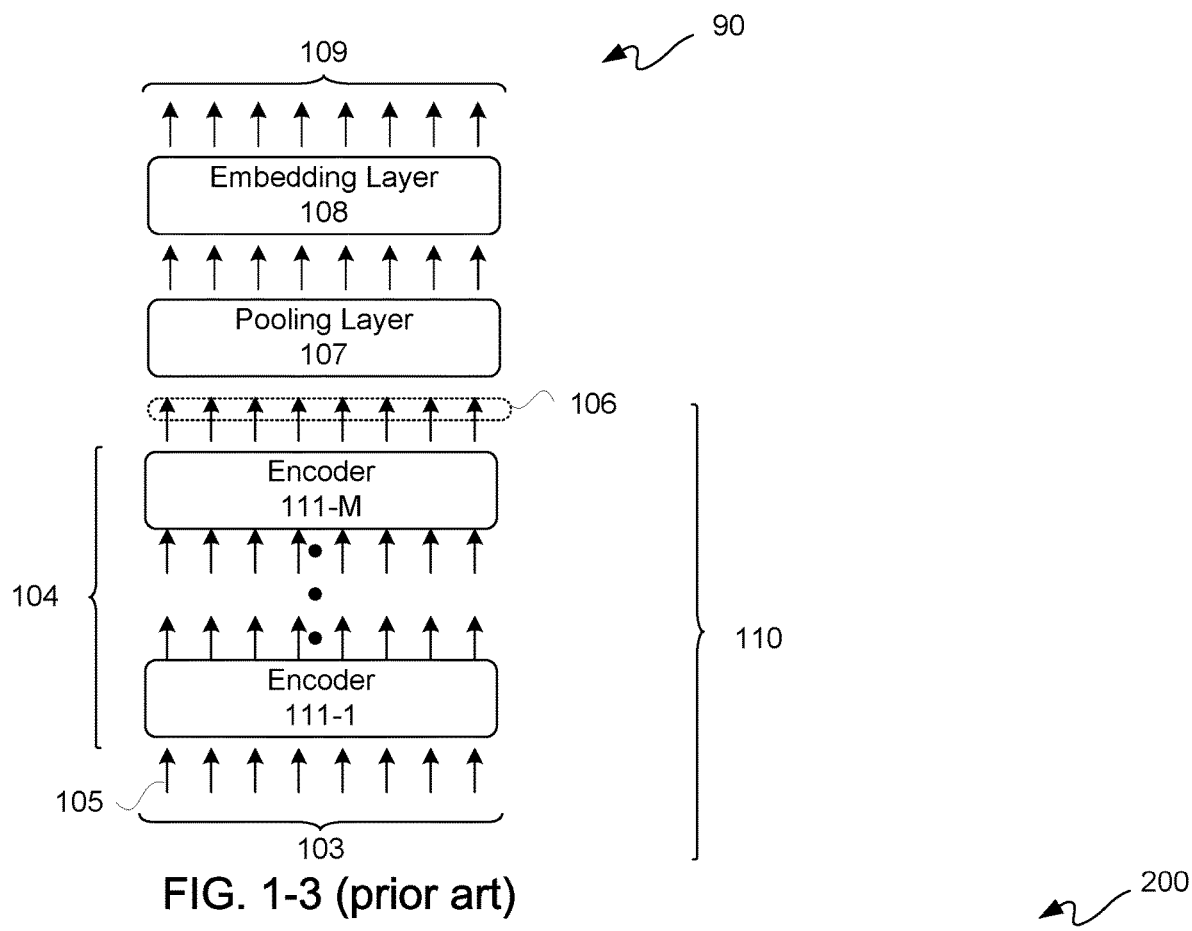
Figure 2:
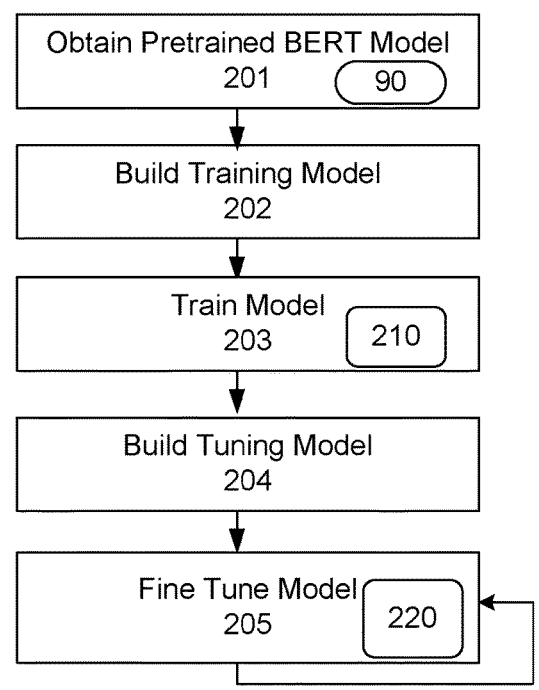

FIG. 1-3 is a block diagram depicting an example of a known "Sentence-BERT" or "S-BERT" model 90, generally a modified BERT model 110. A BERT model 110 may be applied as a core architecture of a Neuro Network Model (NN). In addition to such a BERT architecture, a modification may be made "on top" of BERT model 110.

Along those lines, for an S-BERT model 90, a pooling layer 107 may be coupled to receive outputs 106 from a final output encoder layer of BERT model 110. A pretrained S-BERT model may leverage a pretrained BERT model 110 to produce a semantical search mechanism on input embeddings. Outputs of pooling layer 107 may be provided as an inputs to an embedding layer 108 of S-BERT model 90, and outputs or generated embedding values 109 of embedding layer 108 may be obtained from S-BERT model 110S. In general, an S-BERT model 110S may be referred to as "Sentence-Transformers," namely a common architecture name of an NN architecture with variants.

FIG. 2 is a flow diagram of an example model building flow 200 for training a BERT model. At operation 201, a known pretrained S-BERT model 90, such as for example a base or large version thereof, may be obtained.

At operation 202, a training model is built to further train a pretrained base S-BERT model 90. At operation 203, such pretrained base S-BERT model 90 is further trained with such training model to obtain a trained S-BERT model 210. At operation 204, a tuning model may be built to fine tune a trained S-BERT model 210.

At operation 205, such trained S-BERT model 210 may be fine-tuned with such tuning model to produce a fined tuned version of S-BERT model 210, namely S-BERT model 220. Thereafter, operation 205 may be iteratively repeated to further fine tune S-BERT model 220.

FIG. 3-1 is a block diagram depicting an example a training system 300. Training system 300 may be used for training a pretrained S-BERT model 90 at operation 203 of FIG. 2. FIG. 3-2 is a flow diagram depicting an example of a training flow 350 for training a S-BERT model with training system 300. For purposes of clarity, training system 300 and training flow 350 are further described together with simultaneous reference to FIGS. 1-1 through 3-2.

A frontend input of training system 300 includes a plurality of scanners 301-1 through 301-P for P a positive integer greater than one. In this example, each scanner 301 includes an optical character recognition ("OCR") engine 302, a template OCR engine 303, and an email handler 304. At scanning operation 351, pages of documents 305 may be fed into scanners 301 in parallel. At character recognition operation 352, each scanner 301 may convert images to words and other page features using a corresponding OCR engine 312. Though OCR is described herein for purposes of example, other types of character recognition may be used, including for example optical word recognition, intelligent character recognition, or intelligent word recognition.

At operation 353, a template OCR engine 313 may extract unnecessary features from each scanned page, for example items other than words, in order to clean up each input 333-1 through 333-P, respectively. Additionally, template OCR engine 313 may be configured to replace punctuation, such as for example "." or ";", with corresponding tokens in each input 333-1 through 333-P, respectively, as part of extraction at operation 353. Inputs to a S-BERT model may include a CLS, among other tokens as well as words, as previously described.

At operation 354, template OCR engine 313 may be configured to segment inputs into sets of one or more sentences. In this example, inputs are segmented into a page worth of inputs, and sub-segmented therein by delineating one sentence from another.

Furthermore, template OCR engine 313 may be configured to classify each set of pages. For example, a set of pages from a same book or file may be classified as such at categorization operation 355. This classification may persist by having template OCR engine 313 add a token in association with each input 333-1 through 333-P, respectively.

Operations 353 through 354 may be thought of as curating or templating content, including textual contents, responsive to OCR of such content. Configured scanners 301 may be for a training model as described at operation 202. Feeding a P-tuple of input streams 333 may be for training at operation 203. An email handler 304 may be configured to send an email when a scanning, optical character recognizing and templating operation is complete, such as for loading another set of training documents or other pages for scanning.

Outputs from template OCR engines 303 may correspondingly provide S-BERT input streams 333-1 through 333-P. Accordingly, a P-tuple of input streams representing "training documents" may be provided as inputs streams 333 may be provided as input for pretrained S-BERT model 90 for training thereof. However, collectively these input streams may be wider than an S-BERT model. Along those lines, these streamed training documents may be buffered at buffering operation 356 in a buffer memory 306 at operation 356.

Such a buffer memory 306 in this example may be accessed as a folder in a directory; however, other types of buffer memory may be used in other examples. In this example, buffer memory 306 acts like a barrel shifter buffer, and input streams 333 are barrel-shifted out 1 through P one input stream at a time at operation 356 as output streams 334 for input to pretrained S-BERT model 90. Furthermore, a buffer memory may be separate from or included in a S-BERT model.

At operation 356, buffer memory 356 may output, such as sequential extraction, unloading or reading for example, content or input streams. Pretrained S-BERT model 90 may sequentially encode, pool and embed such input streams at operation 357 to provide output streams 334 to train such pretrained S-BERT model 90 to output a trained S-BERT model 210 therefrom. In other words, a trained S-BERT model 210 may be generated from a pretrained S-BERT model 90 that is trained with training documents representing at least in part word contents thereof, categorization information and segmentation information.

Figures 1, 3:
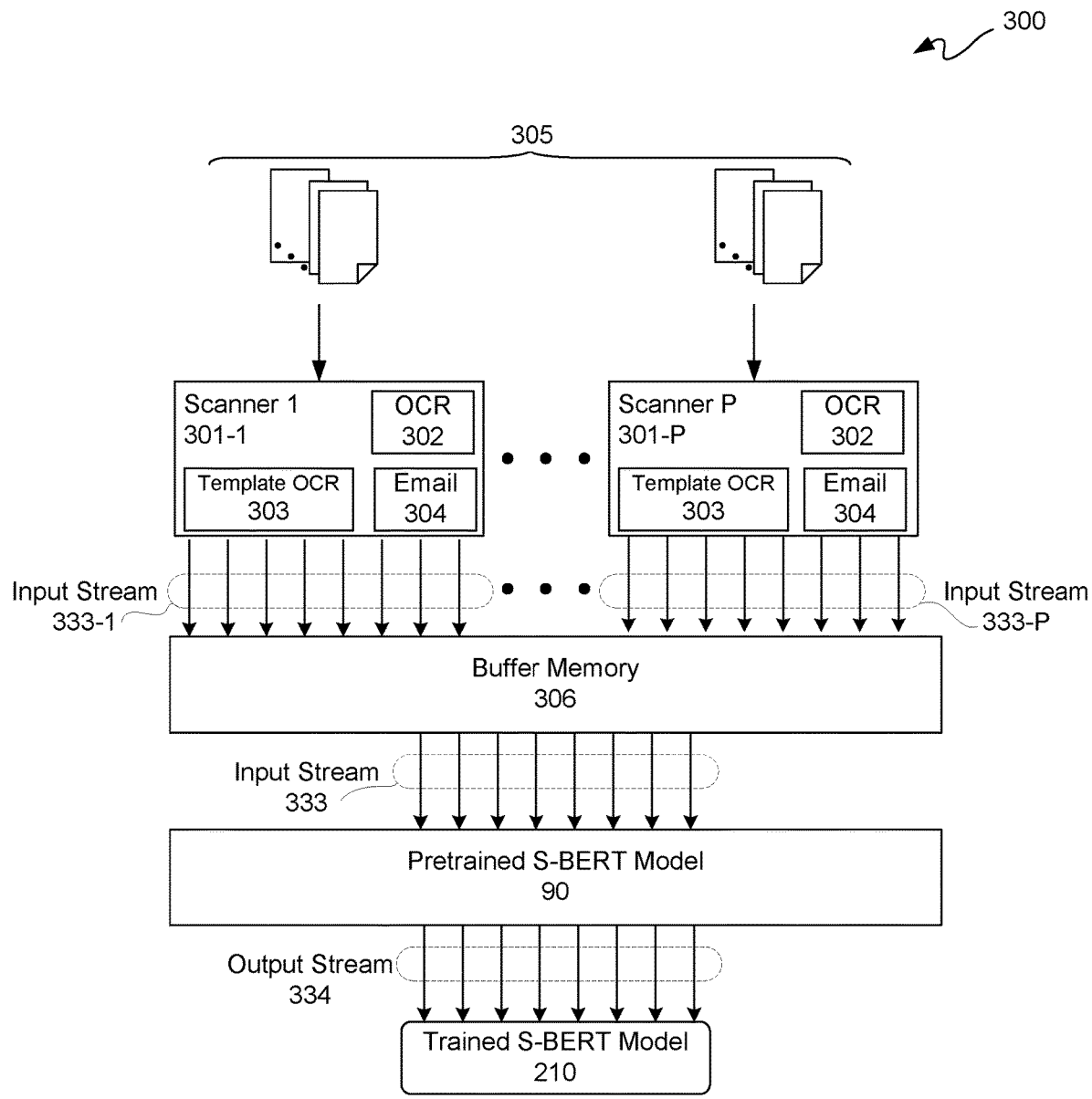
Figures 2, 3:
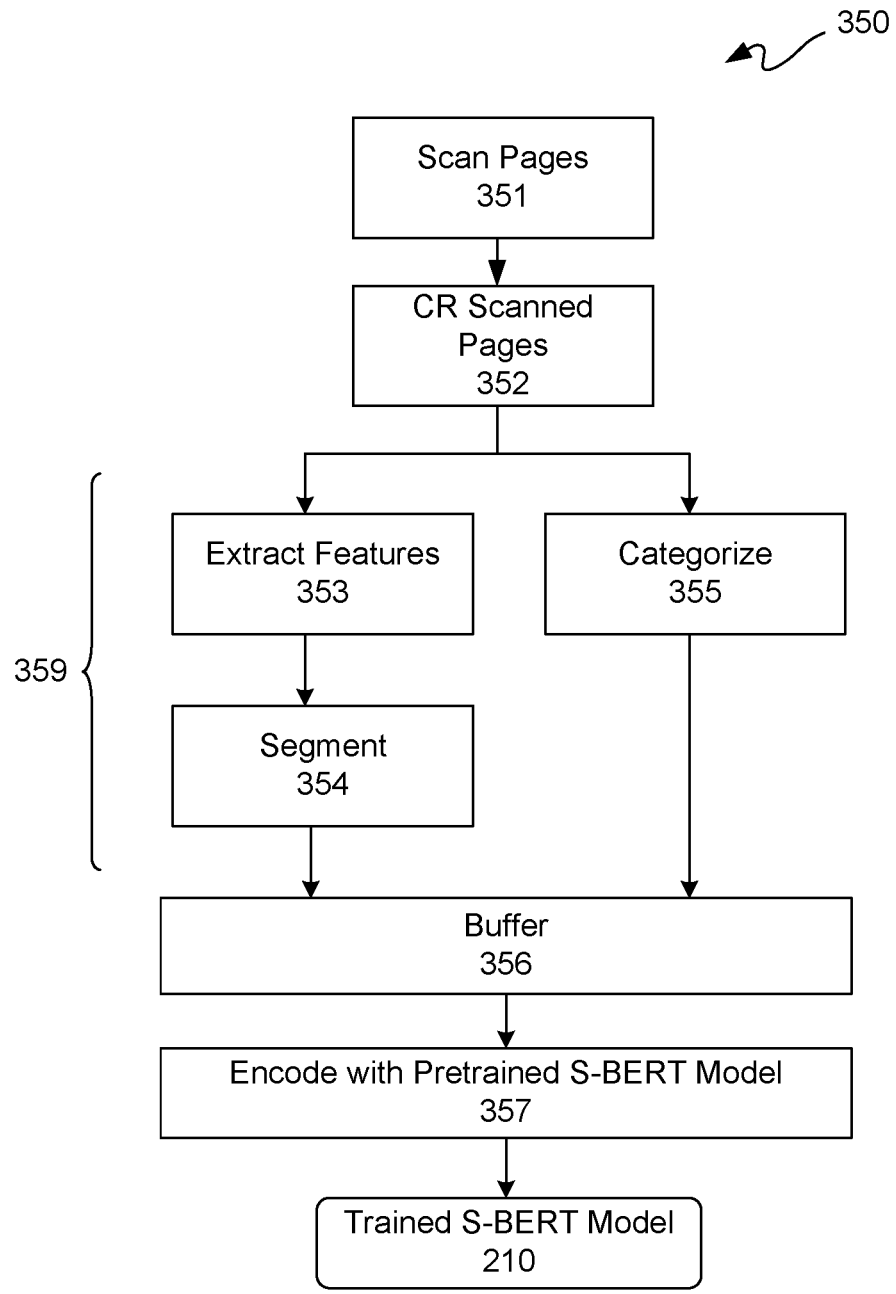
Figure 3:
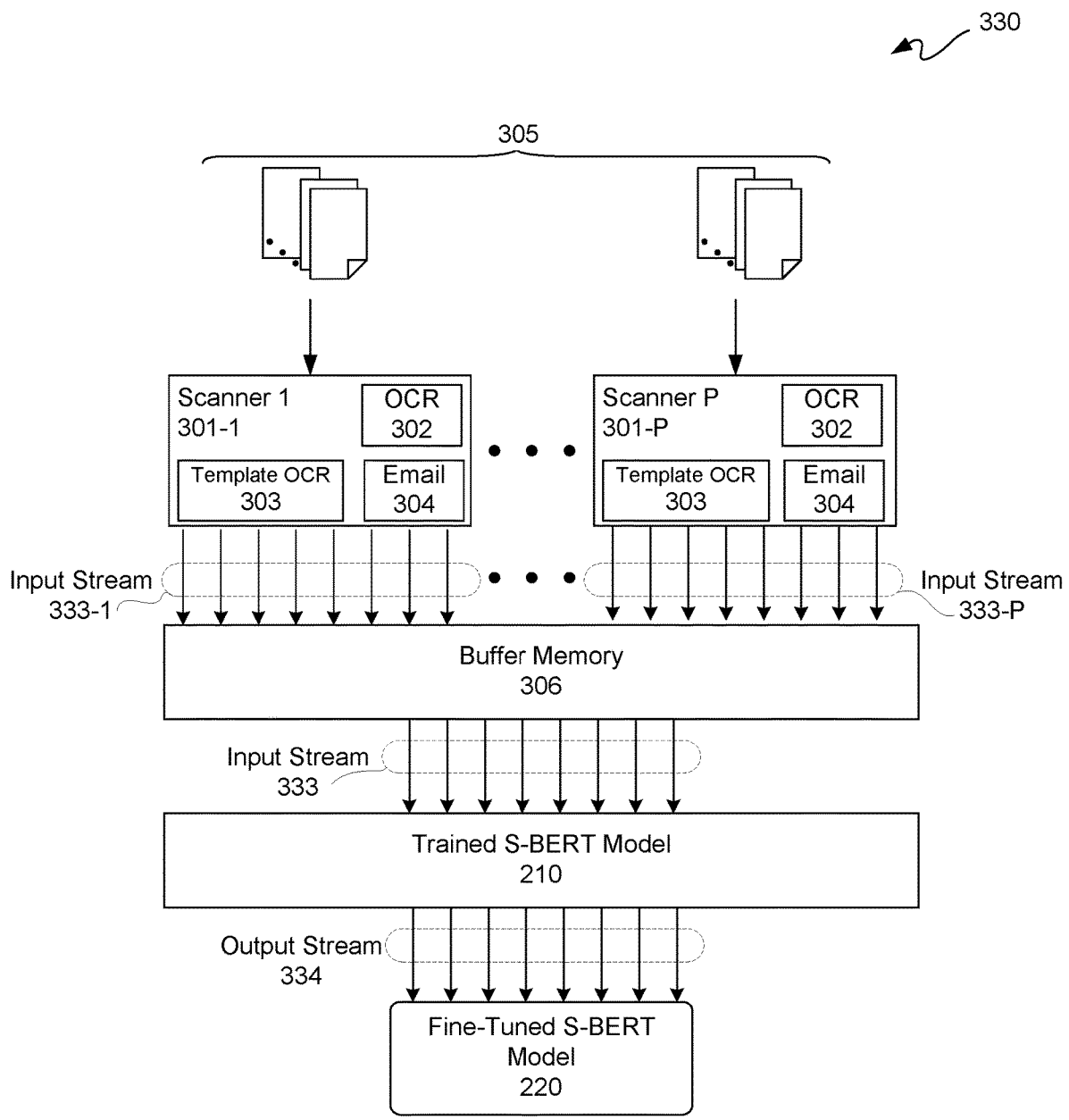
Figures 3, 4:
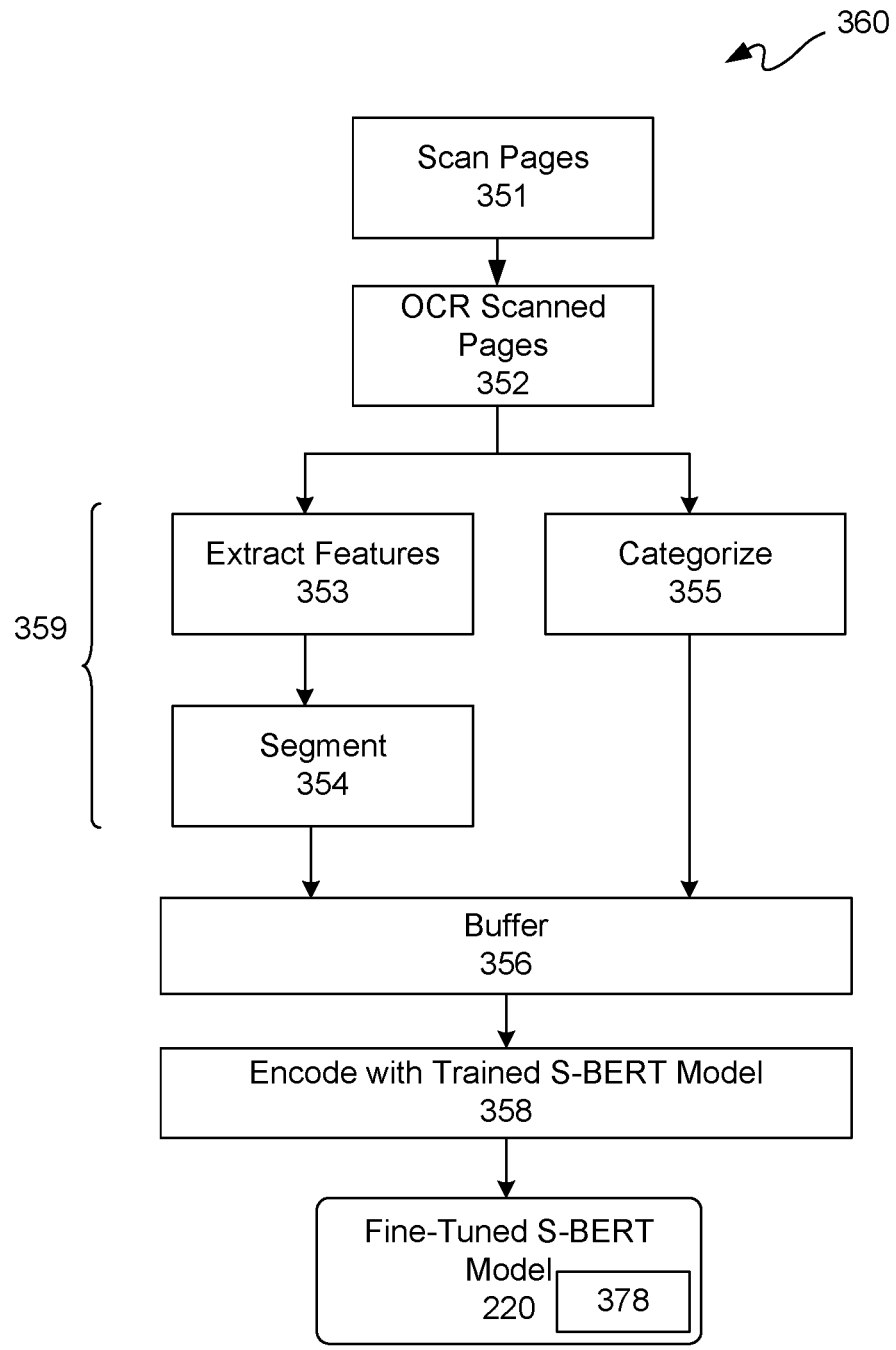

FIG. 3-3 is a block diagram depicting an example a fine-tuning system 330. Fine-tuning system 330 may be used for fine tuning a trained S-BERT model 210 at operation 205 of FIG. 2. FIG. 3-4 is a flow diagram depicting an example of a fine tuning flow 360 for fine tuning training a S-BERT model with fine tuning system 330. For purposes of clarity, fine tuning system 330 and fining tuning flow 360 are further described together with simultaneous reference to FIGS. 1-1 through 3-4. However, as fine tuning system 330 and fining tuning flow 360 are in effect training and correspond to training system 300 and training flow 350, there are similarities between them. Accordingly, generally only the differences are described below for purposes of clarity and not limitation.

Operations 351 through 355 may be repeated; however, upon repeat generally only textual contents of training documents are used for fine tuning or refinement of a trained S-BERT model 210. A trained S-BERT model 210 may encode, pool and embed input streams 333 at operation 358 to provide output streams 334 to output a fine-tuned S-BERT model 220. In other words, a fine-tuned S-BERT model 220 may be generated from a trained S-BERT model 210 that is trained with training documents representing at least in part word contents thereof, categorization information and segmentation information. Though the same training documents are used in this example for fine-tuning to avoid having to rescan, process and buffer training documents, in other examples these and/or other training documents may be used.

A fine-tuned S-BERT model 220 may be configured with a merge task 378 after training, as well as fine-tuned after fine tuning. A merge task 378 may be responsible for assembly of parts of a document into an original form as a final output of a task. In other words, a fine-tuned S-BERT model 220 may be configured to perform a categorization task used with feature extraction and segmentation tasks, as previously described. In addition to such tasks, a fine-tuned S-BERT model 220 may be configured to perform a merge task 378.

Merge task 378 may include two subtasks to be performed on input data, such as from training or non-training data. A classification or categorization task, such as may be consistent with categorization operation 355, may be a first subtask. A second subtask may be merging a sequence of scanned pages into an original document in a source or original order. A merging task 378 resolves a classification task because data segmentation is based on closely semantical relations inside the content of input data. A merge task 378 uses classification and segmentation information for performing merging.

Figures 3, 4, 5:
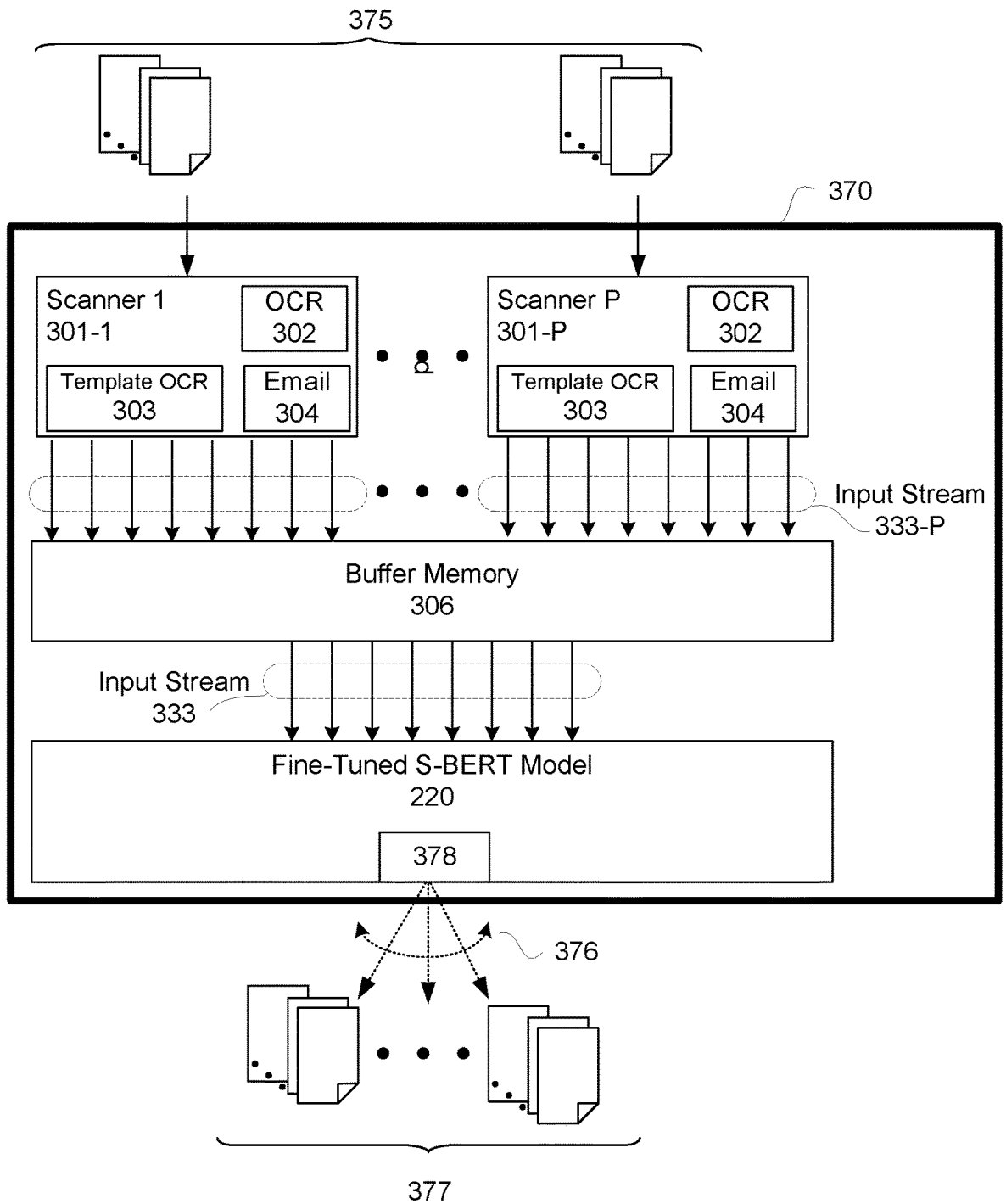

A fine-tuned S-BERT model 220 may be configured to automatically categorize and assemble non-training documents into original configurations thereof from multiple scanned pages thereof distributed across multiple scanners each configured OCR. Along those lines, FIG. 3-5 is a block diagram depicting an example automatic document processing system 370. Non-training documents 375 may be scanned by scanners 301, as previously described, to provide input streams 333. Such input streams 333 may be buffered in buffer memory 306, and sequentially output therefrom for input to a fine-tuned S-BERT model 220.

Fine-tuned S-BERT model 220 may be capable of processing multiple documents 375 automatically. Along those lines, fine-tuned S-BERT model 220 may be configured to perform document classification to group documents into predefined classes by merging operation 378. Fine-tuned S-BERT model 220 may be able to automatically distinguish scanned documents from other scanned documents. Furthermore, fine-tuned S-BERT model 220 may distinguish one document from another, as well as one page from another, without having to have bounds between pages, such as footers, headers, or the like. For example, a bunch of documents may be brought to scanners to make electronic copies, and document processing system 370 may be used to input and automatically sort 376 pages and documents into electronic version 377 of their source documents 375 by merging operation or task 378. At operation 376, either trained S-BERT model 210 or fine-tuned S-BERT model 220 may be used for automatically linking multiple scanned pages from multiple electronic files to reassemble training or other source documents into original configurations thereof by merging operation 378.

Both trained S-BERT model 210 and fine-tuned S-BERT model 220 is each configured for link multiple files, such as initially generated from scanning, to reassemble training documents at operation 376. Along those lines, trained S-BERT model 210 and fine-tuned S-BERT model 220 is each configured to order multiple scanned pages corresponding to training documents distributed across plurality of scanners into original sets thereof for operation 376, though the example is for fine-tuned S-BERT model 220. Fine-tuned S-BERT model 220 is configured to automatically categorize and assemble non-training documents into original configurations thereof with greater accuracy than trained S-BERT model 210.

FIG. 3-6 is a pictorial diagram of an example of a capture manager user interface (UI) 380. In this example, capture manager UI 380, which may be displayed on a screen display (described elsewhere herein) includes natural language processing (NLP) function folders 381. In this example, NLP function folders 381 include a merge function folder 382, a clustering function folder 383, a sentiment function folder 384, a summarization function folder 385, and a translation function folder 386.

Icons in such a UI may be linked to perform a series of functions on data. In example 387, a source icon 388 is concatenated with a merge function folder 382 followed by a copy to folder function folder 389. Along those lines, a merge task 375 may be carried out by merging data from a source identified by source icon 388 by a merge function 382, and results thereof may be copied to a folder, which may reference a database.

FIG. 3-7 is a block-flow diagram of an example of an information processing system 390. Heretofore, it was assumed that documents provided to a trained, or in this example, fine-tuned S-BERT model 220 originated from scanners. However, scanners and/or other devices may be used to provide information to a fine-tuned S-BERT model 220.

One or more standalone printers 391, one or more scanners 392, and/or one or more business printers 393 may provide documentation to a fine-tuned S-BERT model 220 operating on one or more computer systems 394. Such a fine-tuned S-BERT model 220 may include a merge task or function 378. Documentation bussed or networked 398 to such computer system(s) 394 for fine-tuned S-BERT model 220 may be processed as previously described. Fine-tuned S-BERT model 220 in response to such documentation may generate embedding values as outputs, such as from an embedding layer as previously described.

A vector database 397 may be in communication with fine-tuned S-BERT model 220, including merge task 378. Vector database 397 may store such embedding values to increase performance of workflow execution. Along those lines, a sematic searching feature for searching an embedding data space may be provided by vector database 397 may be used to more readily automatically process incoming documentation by merge task 378. Output of such an S-BERT model, or more particularly merge task 387, may be bussed or networked 399 to one or more of a networked 399 server storage 394, web server 395 and/or network server 396.

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

FIG. 5 is block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figures 3, 4, 5, 6:
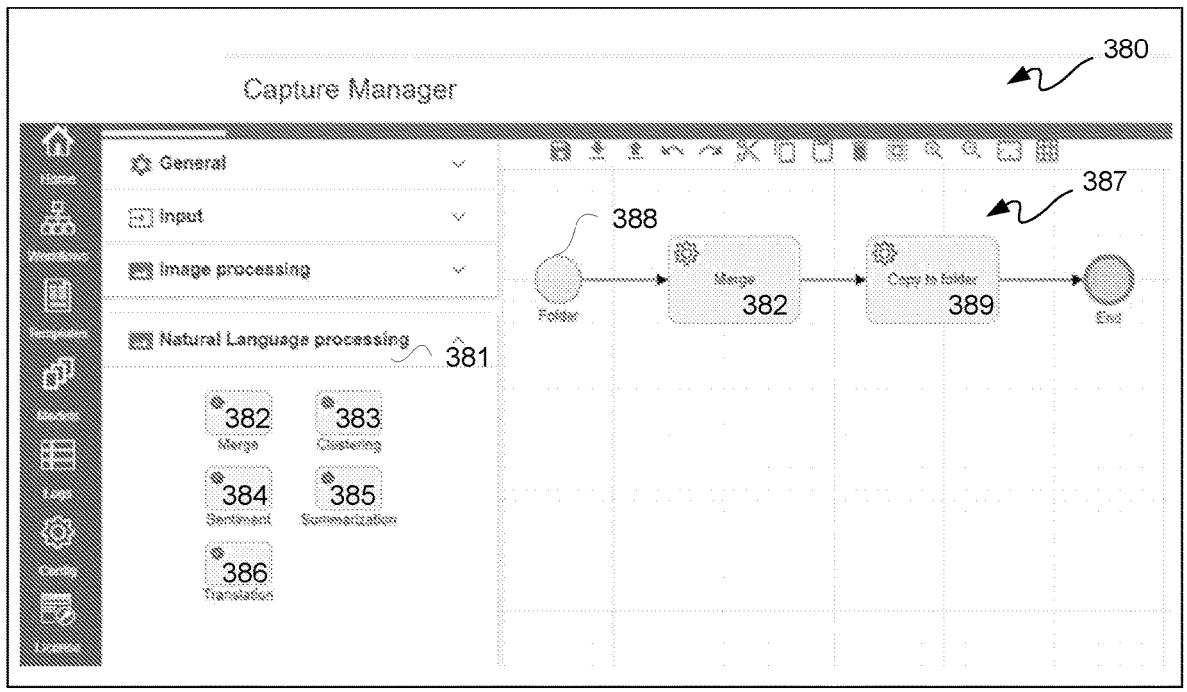

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figures 3, 4, 5, 6, 7:
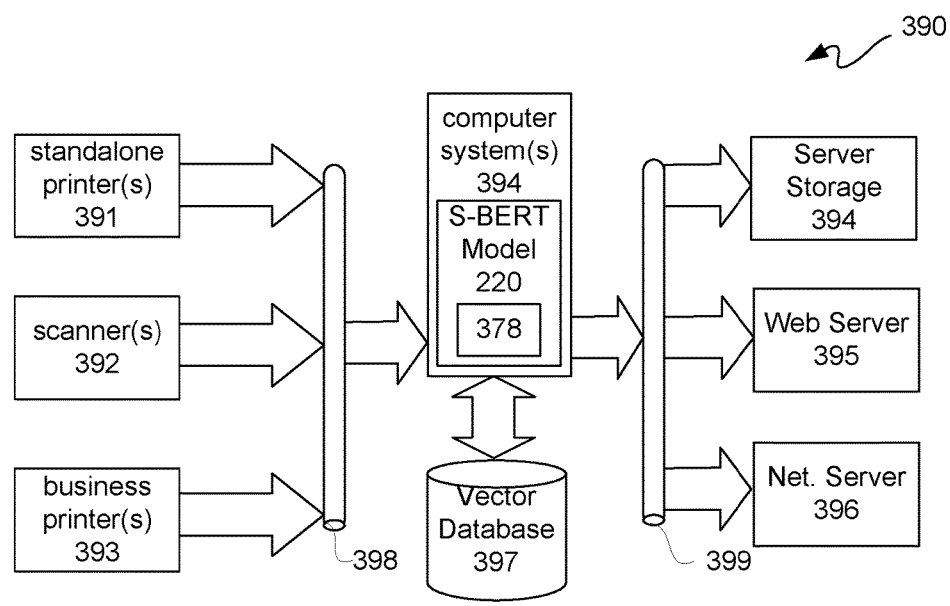
Figure 4:
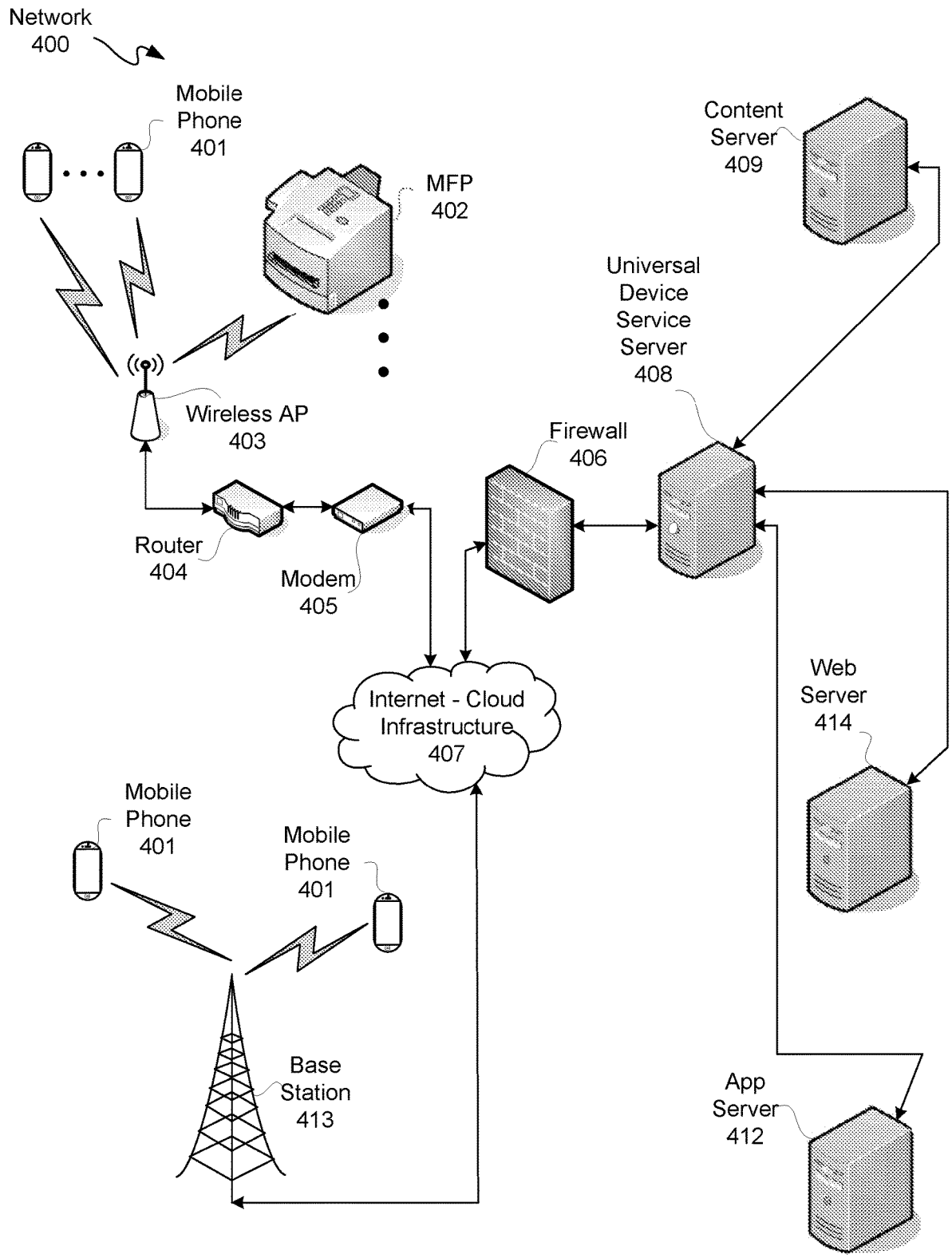
Figure 5:
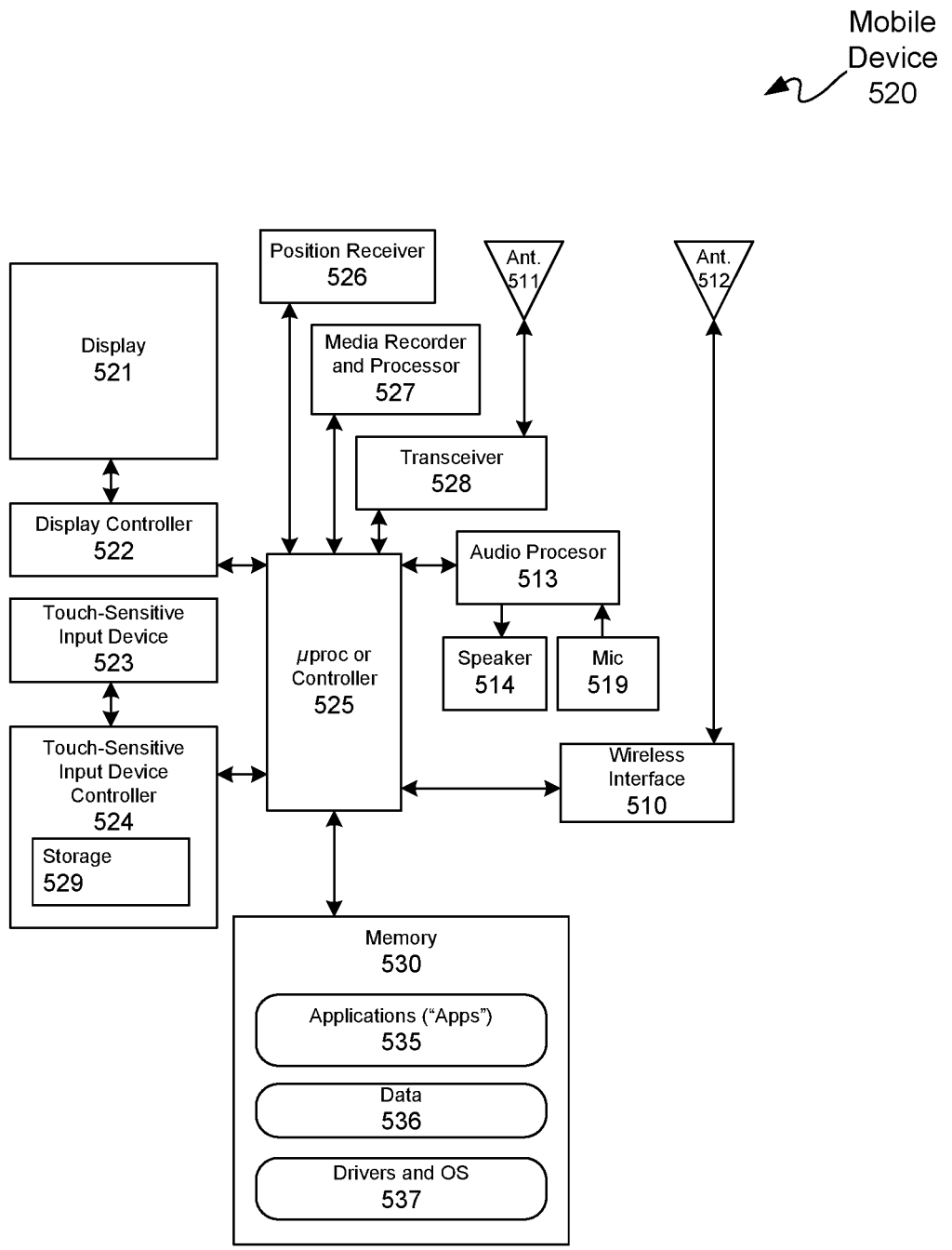
Figure 6:
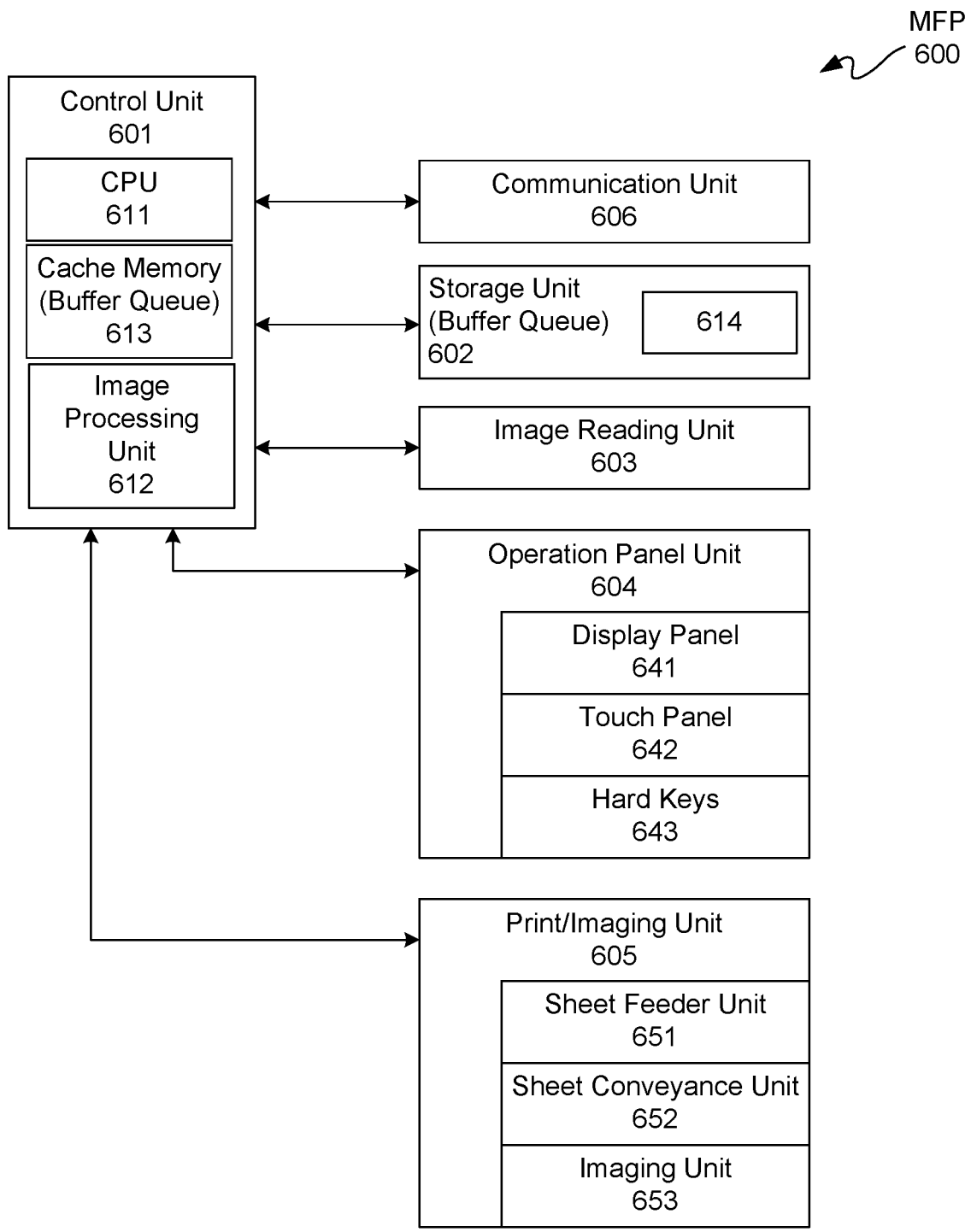
Figure 7:
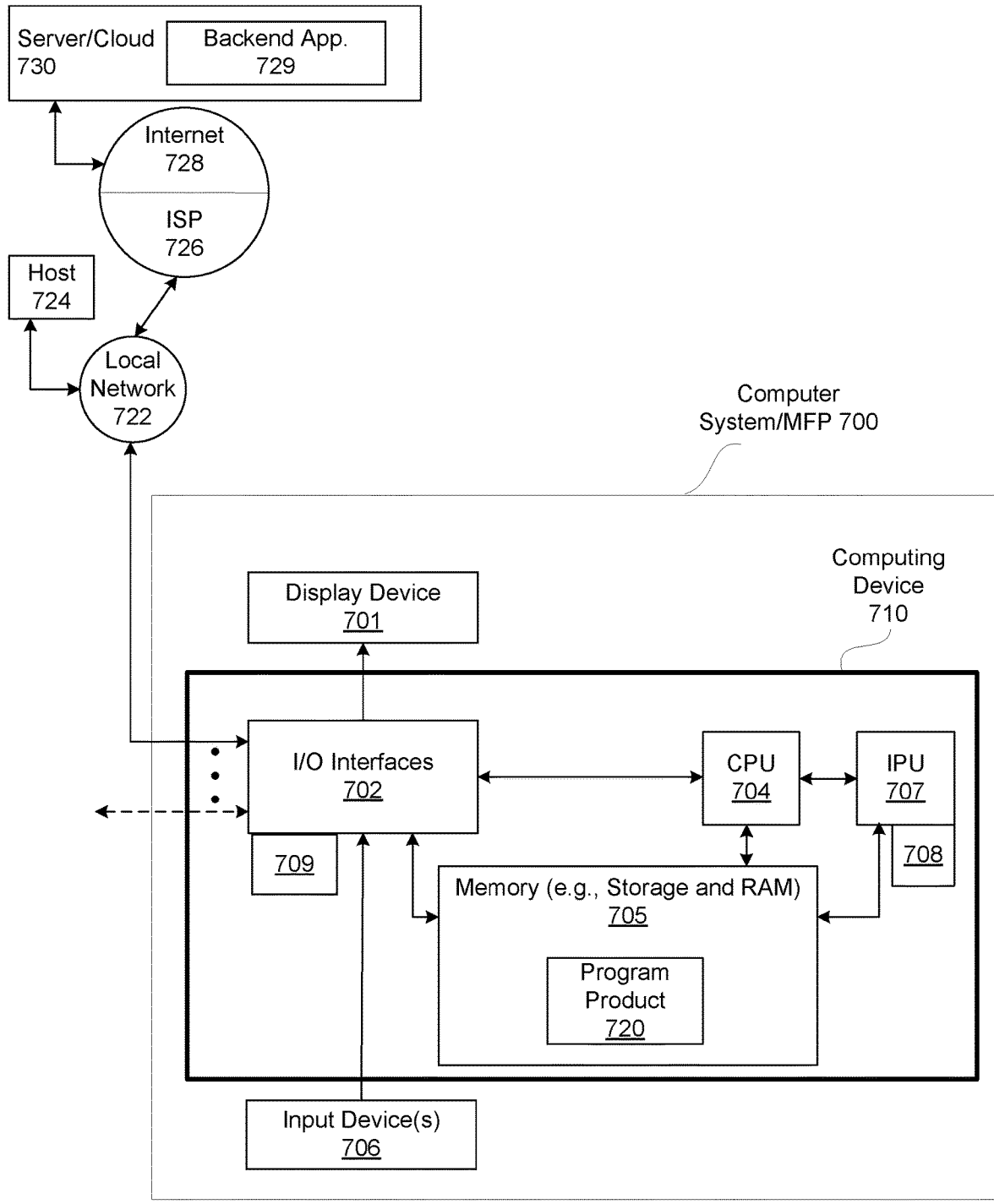

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for performing a machine learning task on training documents to generate an output, comprising:
    obtaining a pretrained Sentence Bidirectional Encoder Representational Transformers ("S-BERT") model;
    scanning the training documents by a plurality of scanners;
    recognizing content of the scanned training documents by applying character recognition operations;
    templating the content responsive to the character recognition operations;
    processing the templated content with the pretrained S-BERT model for training thereof; and
    generating a trained S-BERT model from the processing of the templated content as the output of the pretrained S-BERT model;
    wherein the trained S-BERT model is configured to automatically categorize and assemble non-training documents into original configurations thereof.

2. The method according to claim 1, further comprising streaming the content for:
    extracting features from and segmenting the content; and
    categorizing the content.

3. The method according to claim 2, further comprising:
    buffering the templated content after the extracting, the segmenting and the categorizing in a buffer memory; and
    reading the templated content from the buffer memory for the processing.

4. The method according to claim 3, wherein the trained S-BERT model is configured for linking multiple files to reassemble the training documents.

5. The method according to claim 4, wherein the trained S-BERT model is configured with a merge function to order multiple scanned pages corresponding to the training documents distributed across the plurality of scanners into original sets thereof.

6. The method according to claim 5, wherein the character recognition is optical character recognition.

7. The method according to claim 5, wherein the character recognition is optical word recognition.

8. The method according to claim 4, wherein the content is first content, the method further comprising:
    reprocessing each of the training documents with the character recognition operations to provide second content; and
    streaming the second content for:
        extracting features from and segmenting the second content; and
        categorizing the second content.

9. The method according to claim 8, further comprising:
    processing the second content with the trained S-BERT model for tuning thereof; and
    generating a fine-tuned S-BERT model from the processing of the second content as the output.

10. The method according to claim 9, wherein:
    the training documents are first training documents; and
    the reprocessing is of second training documents.

11. The method according to claim 10, wherein the fine-tuned S-BERT model is configured to automatically categorize and assemble the non-training documents into the original configurations thereof.

12. The method according to claim 9, further comprising buffering the second content in the buffer memory.

13. The method according to claim 1, wherein the trained S-BERT model is implemented as a stack of encoders, a pooling layer and an embedding layer.

14. The method according to claim 13, wherein each of the encoders of the stack comprises a self-attention head, a first and a second adder and normalizer, and a first and a second feed forward neural network.

15. A system for performing a machine learning task on training documents to generate an output, the system comprising:
- a plurality of scanners configured to scan the training documents;
- each of the plurality of scanners configured to perform character recognition operations to recognize content of the training documents;
- each of the plurality of scanners configured to template the content responsive to the character recognition operations;
- a pretrained Sentence Bidirectional Encoder Representational Transformers ("S-BERT") model configured to process the templated content to train the S-BERT model; and
- a trained S-BERT model generated from the processing of the templated content as the output of the pretrained S-BERT model;
- wherein the trained S-BERT model is configured to automatically categorize and assemble non-training documents into original configurations thereof.

16. The system according to claim 14, wherein each of the plurality of scanners is configured to:
- extract features from and segment the content; and
- categorize the content.

17. The system according to claim 16, further comprising:
- a buffer memory coupled to buffer streams of the templated content after extracting, segmenting and categorizing thereof; and
- wherein the S-BERT model is configured to read the templated content from the buffer memory for processing thereof.

18. The system according to claim 17, wherein the trained S-BERT model is configured to link multiple files to reassemble the training documents.

19. The system according to claim 17, wherein the trained S-BERT model is configured with a merge function to order multiple scanned pages corresponding to the training documents distributed across the plurality of scanners into original sets thereof.

20. The system according to claim 19, wherein the content is first content, the system further comprising:
- each of the plurality of scanners configured with the character recognition operations to recognize second content of the training documents from reprocessing thereof;
- each of the plurality of scanners configured to stream the second content to:
  - extract features from and segment the second content; and
  - categorize the second content; and
- the trained S-BERT model is configured to process the second content for tuning thereof to generate a fine-tuned S-BERT model.

* * * * *